United States Patent
Massard et al.

(10) Patent No.: US 8,896,904 B2
(45) Date of Patent: Nov. 25, 2014

(54) ELECTROWETTING DISPLAY DEVICE

(75) Inventors: Romaric Massard, Eindhoven (NL);
Chiara Cometti, Eindhoven (NL);
Bokke Johannes Feenstra, Neunen (NL)

(73) Assignee: Liquavista B.V., Eindhoven (NL)

( * ) Notice: Subject to any disclaimer, the term of this patent is extended or adjusted under 35 U.S.C. 154(b) by 8 days.

(21) Appl. No.: 13/608,154

(22) Filed: Sep. 10, 2012

(65) Prior Publication Data

US 2013/0057941 A1    Mar. 7, 2013

Related U.S. Application Data

(63) Continuation of application No. PCT/EP2011/053783, filed on Mar. 14, 2011.

(30) Foreign Application Priority Data

Mar. 15, 2010    (GB) .................................. 1004244.8

(51) Int. Cl.
*G02B 26/00*    (2006.01)
*G02B 26/02*    (2006.01)

(52) U.S. Cl.
CPC .................................. *G02B 26/005* (2013.01)
USPC .......... 359/290; 359/228; 359/226.3; 359/245

(58) Field of Classification Search
USPC .............. 359/290–295, 298, 245, 228, 226.3, 359/253, 254, 665, 666; 29/825; 216/13, 216/20; 516/198, 204; 427/58, 595; 156/247
See application file for complete search history.

(56) References Cited

U.S. PATENT DOCUMENTS

| | | | |
|---|---|---|---|
| 7,760,420 B2* | 7/2010 | Cheng et al. .................. | 359/297 |
| 7,791,815 B2* | 9/2010 | Weikart et al. ................ | 359/666 |
| 7,872,790 B2* | 1/2011 | Steckl et al. .................. | 359/253 |
| 8,059,328 B1* | 11/2011 | Kuo et al. ..................... | 359/290 |
| 8,199,409 B2* | 6/2012 | Hayes et al. .................. | 359/665 |
| 2009/0040591 A1 | 2/2009 | Cheng et al. | |

(Continued)

FOREIGN PATENT DOCUMENTS

| CN | 101669060 A | 3/2010 |
|---|---|---|
| JP | 2007532942 A | 11/2007 |
| JP | 2009210738 A | 9/2009 |
| WO | 2008125644 A1 | 10/2008 |

OTHER PUBLICATIONS

Zhou, K., et al., "A full description of a simple and scalable fabrication process for electrowetting displays," Journal of Micromechanics & Microengineering, Institute of Physics Publishing, Bristol, GB, vol. 19, No. 6, Jun. 1, 2009, ISSN: 0960-1317.

(Continued)

*Primary Examiner* — Loha Ben
(74) *Attorney, Agent, or Firm* — BainwoodHuang

(57) ABSTRACT

A method for making a support plate for an electrowetting device includes providing the support plate with a hydrophobic layer; arranging a pattern of hydrophilic material on the hydrophobic layer; and removing a surface layer of the hydrophobic layer by a solvent. The electrowetting device may include a support plate with a hydrophobic layer having a thickness, and a pattern of hydrophilic material arranged on a first area of the hydrophobic layer, the thickness of the hydrophobic layer being larger within the first area than outside the first area.

19 Claims, 1 Drawing Sheet

(56) References Cited

U.S. PATENT DOCUMENTS

2009/0168144 A1    7/2009   Lo et al.
2009/0169806 A1    7/2009   Lo et al.
2010/0223779 A1    9/2010   Lo et al.

OTHER PUBLICATIONS

Sun, B., et al., "Scalable fabrication of electrowetting displays with self-assembled oil dosing," Applied Physics Letters, AIP, American Institute of Physics, Melville, NY, US, vol. 91, No. 1, Jul. 2, 2007, pp. 11106-11106, XP012098922, ISSN: 0003-6951, DOI: DOI: 10.1063/1.2753697

Heikenfeld, JC, et al., "Flat Electrowetting Optics and Displays," SPIE, PO Box 10 Bellingham WA 98227-0010 USA, vol. 6887, No. 688705, Dec. 31, 2008, XP040433884.

Lao, Y., et al., "Ultra-High Transmission Electrowetting Displays Enabled by Integrated Reflectors," Journal of Display Technology, IEEE Service Center, New York, NY, US, vol. 4, No. 2, Jun. 1, 2008, pp. 120-122, XP011206218, ISSN: 1551-319X.

\* cited by examiner

ELECTROWETTING DISPLAY DEVICE

CROSS-REFERENCE TO RELATED APPLICATIONS

This application is a continuation of International Application PCT/EP2011/053783 filed 14 Mar. 2011.

TECHNICAL FIELD

The present invention relates to an electrowetting display device and a method for making the same.

BACKGROUND

A known electrowetting display device includes two support plates, each of which includes a substrate. A pattern of walls is arranged on one of the support plates, the pattern defining the extent of the picture elements of the display device. The area between the walls of a picture element, also known as a pixel, is called the display area, over which a display effect occurs. The display effect is created by movement of two immiscible fluids, an oil and an electrolyte, in the picture element under the influence of an electric field. When no field is applied, the oil forms a layer covering the display area of the support plate. On application of a field, the oil contracts and the electrolyte adjoins a large part of the support plate. If for example the oil is opaque, the picture element acts as a light shutter.

The walls of the picture elements are a pattern of a hydrophilic material. The area of the support plate in the display area must to a large extent be hydrophobic for a proper operation of the picture element. During manufacture of the display device the area of the support plate where the picture elements are located is made hydrophobic by including a hydrophobic layer. The walls are made on this layer by depositing a layer of wall material on the hydrophobic layer and patterning the layer of wall material using a photo-lithographic method.

To improve the adhesion between the layer of wall material and the hydrophobic layer, the hydrophobicity of the hydrophobic layer is lowered prior to applying the layer of wall material. After formation of the walls, the support plate is annealed such that the area of the hydrophobic layer between the walls regains its hydrophobicity. However, the quality of display devices made using this method is not satisfactory.

It is desirable to provide a method for making an electrowetting display device that does not have this disadvantage.

SUMMARY

In accordance with first embodiments, there is provided a method for making a support plate for an electrowetting device, comprising the steps of: providing the support plate with a hydrophobic layer; arranging a pattern of hydrophilic material on the hydrophobic layer; and removing a surface layer of the hydrophobic layer by a solvent.

In accordance with further embodiments there is an electrowetting device including a support plate that comprises a hydrophobic layer having a thickness, and a pattern of hydrophilic material arranged on a first area of the hydrophobic layer, the thickness of the hydrophobic layer being larger within the first area than outside the first area.

Further features will become apparent from the following description of embodiments, given by way of example only, which is made with reference to the accompanying drawings.

DETAILED DESCRIPTION

Figure 1:
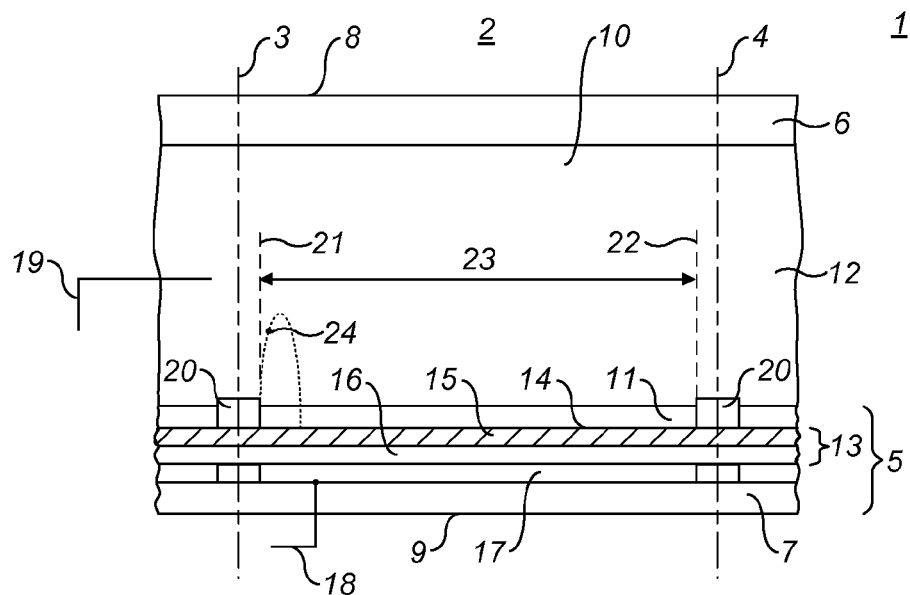
FIG. 1 shows a schematic cross section of a picture element of an electrowetting display device.

The entire contents of priority application GB 1004244.8 and of International Application PCT/EP2011/053783 are incorporated by reference herein.

In accordance with first embodiments, there is provided a method for making a support plate for an electrowetting device, comprising the steps of: providing the support plate with a hydrophobic layer; arranging a pattern of hydrophilic material on the hydrophobic layer; and removing a surface layer of the hydrophobic layer by a solvent.

One of the reasons for the unsatisfactory quality of a known display device appeared to be due to slow flow-back or no flow-back of the oil in a picture element on switching off the electric field after extended operation of the display device. Such flow-back can be improved by including a step of chemically removing a surface layer of the hydrophobic layer after the pattern of hydrophilic material has been arranged on the hydrophobic layer during manufacture of the display device. The chemical removal step is achieved by using a solvent of the material of which the hydrophobic layer is made. The quality of the hydrophobic surface after the solvent treatment appears to be better than after any one of the known treatments. The solvent treatment unexpectedly reduces the surface roughness of the hydrophobic layer, without a need for heating the support plate above the glass temperature of the hydrophobic layer. Consequently, the performance of the picture elements is enhanced and, hence, the quality of the images displayed.

It is believed that the process for arranging the hydrophilic material on the hydrophobic layer affects the hydrophobic layer causing said flow-back problem. The known process step of annealing the hydrophobic layer to restore its hydrophobicity does not sufficiently solve the flow-back problem.

In an embodiment of the method the solvent is a solvent for selectively dissolving material of the hydrophobic layer. If the solvent selectively dissolves the hydrophobic material and dissolves the hydrophilic material of the wall pattern to a smaller degree or not at all, the walls will hardly or not at all be affected by the process removing the surface layer of the hydrophobic layer.

Removing the surface layer of the hydrophobic layer may be performed by contacting the support plate with a liquid solvent or a gas solvent. Contact with a solvent in the gas phase allows an improved control of the removal of material, by a reduced etching rate. In addition, the chance that the removed material will be re-deposited on the surface is reduced. Also, the use of a stopping agent may not be required, as no material will be re-deposited on the surface during the drying phase. The gas may be a vapor.

The step of removing a surface layer may include use of a diluent. The diluent may not dissolve the material of the hydrophobic layer substantially. The diluent dilutes the reactive component of the solvent and decreases its macroscopic efficiency, thereby slowing down the dissolution rate and permitting a better control of the removal of the surface layer of the hydrophobic layer. The diluent may be volatile to facilitate removal of the diluent from the support plate after completion of the removal step. The use of the diluent mitigates any problems of re-deposition in the display area of remnants of wall material or lithographic lacquer, released from the hydrophilic area during the removal step, or the re-deposition of hydrophobic material, dissolved during the removal step, at undesired places, for instance on top of the walls. The existence of remnants in the display area in known display devices may be one of the causes of the slow flow-back of known display devices. The presence of remnants may be determined using surface analysis techniques, such as XPS or TOF-SIMS.

The solvent may be fluorocarbon-based and/or, in a method using a diluent, the diluent may be oil-based. Any solvent or diluent trapped in the sometimes slightly porous hydrophobic layer after the surface layer removal may have less effect on the hydrophobicity of the layer when it is an oil-based solvent or diluent than an aqueous solvent or diluent.

In examples when the solvent and the diluent form a solution, the homogeneity of the solution may improve the uniformity of removal of the hydrophobic material. Components, such as the solvent and the diluent, in a solution are completely mixed and do not form substructures such as particles or micelles as for example in an emulsion.

The method may include a step of stopping removing the surface layer by applying a liquid, the time between the step of removing the surface layer and the application of the liquid being sufficiently short for the solvent not to dry before said liquid is applied. If the solvent is not allowed to dry on the support plate, the re-deposition of remnants of wall material in the display area and of hydrophobic material on the walls is reduced.

The method may include the step of annealing the support plate, thereby improving the adherence of the pattern of hydrophilic material to the hydrophobic layer. The annealing step may be performed after the surface layer removal step. The annealing temperature used in the process according to an example can be lower than that used in known annealing steps. Known methods use annealing temperatures just below the melting temperature and above the glass transition temperature of the hydrophobic material; e.g. amorphous fluoropolymer is annealed at a temperature between 220 and 260 degrees Celsius to increase the hydrophobicity of the hydrophobic layer. This increase has already been achieved by the solvent step. Hence, the annealing step can be used for improving the adherence only. The annealing step according to an example, for amorphous fluoropolymer, can be carried out a temperature below 220 degrees Celsius, or below 160 degrees Celsius. This lower temperature does not affect the hydrophilic material Annealing at the lower temperature or, alternatively, using another method than annealing for improving the adhesion, may allow employing a plastic substrate in the support plate and making a flexible display device.

The method may include the step of providing a first fluid and a second, electroconductive or polar fluid on the support plate, the first fluid and second fluid being immiscible; providing a further support plate; and sealing the support plate and the further support plate, thereby forming a cavity between the support plate and the further support plate that includes the first and second fluid.

A layer is called 'hydrophobic' if it has a larger wettability for the first fluid than for the second fluid. A layer is called 'hydrophilic' if it has a larger wettability for the second fluid than for the first fluid.

In an embodiment the electrowetting device is an electrowetting display device, which may include a support plate made according to embodiments described herein.

In accordance with further embodiments there is an electrowetting device including a support plate that comprises a hydrophobic layer having a thickness, and a pattern of hydrophilic material arranged on a first area of the hydrophobic layer, the thickness of the hydrophobic layer being larger within the first area than outside the first area.

Since the removal step removes a surface layer of the hydrophobic layer only outside the first area where the pattern of hydrophilic wall material is arranged, the thickness of the hydrophobic layer within the first area will be larger than outside this area. The difference in thickness may be more than 10 nm, for example where the hydrophobic layer has been made less hydrophobic using plasma etching. When the hydrophobic layer has been made less hydrophobic by reactive-ion etching, the difference may be more than 100 nm. In further examples the difference may be more than 150 nm or 200 nm. The controlled removal of more material from the hydrophobic layer will leave behind a thinner layer with a very hydrophobic surface. The thinner layer means the voltage required for switching the electrowetting device may be lower.

The hydrophobic layer has a higher hydrophobicity outside the first area than within the first area. In embodiments, after the surface treatment, a value for the receding contact angle within the first area may be 70 degrees or lower and outside the first area more than 100 degrees and may be more than 110 degrees. The surface after treatment may show within 5 degrees the same receding contact angle as the surface of the hydrophobic layer directly after deposition.

The hysteresis of the oil or first fluid during operation of the display device is smaller than that of a known display device.

The pattern of hydrophilic material forms walls defining the extent of the electrowetting elements in the electrowetting display device.

Embodiments will now be described in detail.

FIG. 1 shows a diagrammatic cross-section of part of an electrowetting device in the form of an electrowetting display device 1. The display device includes a plurality of picture elements 2, one of which is shown in the Figure. The lateral extent of the picture element is indicated in the Figure by two dashed lines 3, 4. The picture elements comprise a first support plate 5 and a second support plate 6. The support plates may be separate parts of each picture element, but the support plates may be shared in common by the plurality of picture elements. The support plates may include a glass or polymer substrate 6, 7 and may be rigid or flexible.

The display device has a viewing side 8 on which an image or display formed by the display device can be viewed and a rear side 9. In the figure the first support plate 5 faces the rear side 9; the second support plate 6 faces the viewing side; alternatively, the first support plate may face the viewing side. The display device may be of the reflective, transmissive or transflective type. The display device may be of a segmented display type in which the image may be built up of segments, each segment including several picture elements. The display device may be an active matrix driven display type or a passively driven display device. The plurality of picture elements may be monochrome. For a color display device the picture elements may be divided in groups, each group having a different color; alternatively, an individual picture element may be able to show different colors.

A space 10 between the support plates is filled with two fluids: a first fluid 11 and a second fluid 12. The second fluid is immiscible with the first fluid. The second fluid is electrically conductive or polar, and may be water or a salt solution such as a solution of potassium chloride in water. The second fluid may be transparent, but may be colored, white, absorbing or reflecting. The first fluid is electrically non-conductive and may for instance be an alkane like hexadecane or (silicone) oil.

The first fluid absorbs at least a part of the optical spectrum. The first fluid may be transmissive for a part of the optical spectrum, forming a color filter. For this purpose the first fluid may be colored by addition of pigment particles or dye. Alternatively, the first fluid may be black, i.e. absorb substantially all parts of the optical spectrum, or reflecting. A reflective layer may reflect the entire visible spectrum, making the layer appear white, or part of it, making it have a color.

The support plate 5 includes an insulating layer 13. The insulating layer may be transparent or reflective. The insulating layer 13 may extend between walls of a picture element. However, to avoid short circuits between the second fluid 12 and electrodes arranged under the insulating layer, the insulating layer may be an uninterrupted layer extending over a plurality of picture elements 2, as shown in the Figure. The insulating layer has a hydrophobic surface 14 facing the space 10 of the picture element 2. The thickness of the insulating layer may be less than 2 micrometer, and may be less than 1 micrometer.

The insulating layer may be a hydrophobic layer; alternatively, it may include a hydrophobic layer 15 and a dielectric layer 16, the hydrophobic layer 15 facing the space 10, as shown in the Figure. The hydrophobic layer may be for instance an amorphous fluoropolymer layer such as AF1600 or AF1601, provided by the company DuPont, or any other low surface energy polymer. The thickness of the hydrophobic layer may be between 300 and 800 nm. The dielectric layer may be a silicon oxide layer or a silicon nitride layer, having a thickness of for example 200 nm.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid.

Each element 2 includes an electrode 17 as part of the support plate 5. The electrode 17 is separated from the fluids by the insulating layer 13; electrodes of neighboring picture elements are separated by a non-conducting layer. Other layers may be arranged between the insulating layer 13 and the electrode 17. The electrode 17 can be of any desired shape or form. The electrode 17 of a picture element is supplied with voltage signals by a signal line 18, schematically indicated in the Figure. A second signal line 19 is connected to an electrode that is in contact with the conductive second fluid 12. This electrode may be common to all elements, when they are fluidly interconnected by and share the second fluid, uninterrupted by walls. The picture element 2 can be controlled by a voltage V applied between the signal lines 18 and 19. The electrodes 17 on the substrate 7 are coupled to a display driving system. In a display device having the picture elements arranged in a matrix form, the electrodes can be coupled to a matrix of control lines on the substrate 7.

The first fluid 11 is confined to one picture element by walls 20 that follow the cross-section of the picture element. The cross-section of a picture element may have any shape; when the picture elements are arranged in a matrix form, the cross-section is usually square or rectangular. Although the walls are shown as structures protruding from the insulating layer 13, they may also be a surface layer of the support plate that repels the first fluid, such as a hydrophilic or less hydrophobic layer. The walls may extend from the first to the second support plate but may also extend partly from the first support plate to the second support plate as shown in FIG. 1. The extent of the picture element, indicated by the dashed lines 3 and 4, is defined by the center of the walls 20. The area between the walls of a picture element, indicated by the dashed lines 21 and 22, is called the display area 23, over which a display effect occurs.

Figure 2:
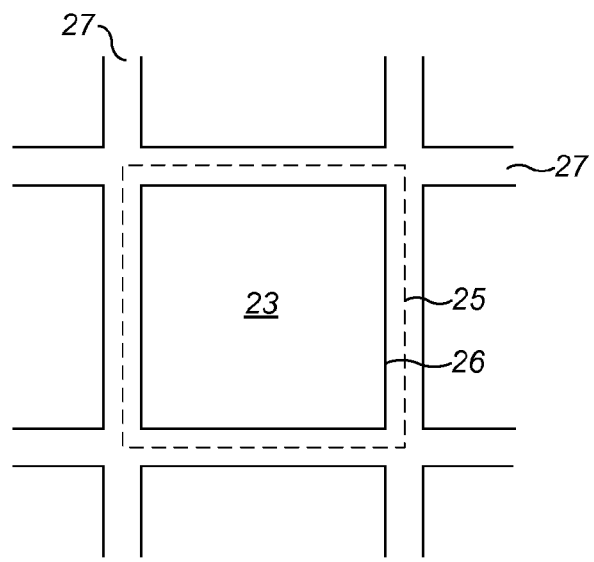
FIG. 2 shows a schematic plan view of the first support plate of the display device.

FIG. 2 shows a matrix of square picture elements in a plan view of the hydrophobic layer of the first support plate. The extent of the central picture element in FIG. 2, corresponding to the dashed lines 3 and 4 in FIG. 1, is indicated by the dashed line 25. Line 26 indicates the inner border of a wall; the line is also the edge of the display area 23. The pattern of the walls 20 cover a first area 27.

When no voltage is applied between the electrodes, the first fluid 11 forms a layer between the walls 20, as shown in the FIG. 1. Application of a voltage will contract the first fluid, for example against a wall as shown by the dashed shape 24 in FIG. 1. The controllable shape of the first fluid is used to operate the picture element as a light valve, providing a display effect over the display area 23.

During the manufacturing process of the display device, an electrode structure comprising electrodes 17 is provided on the substrate 7. Subsequently, the insulating layer 13 including the hydrophobic layer 15 is arranged on the electrode structure.

The surface 14 of the hydrophobic layer 15 is prepared for application of the walls by a process step reducing the hydrophobicity of the surface. This step may include reactive ion etching and/or a plasma treatment. The part of the surface 14 outside the area of the display device where the image is formed may be screened off from this step. The area where the image is formed is the area of the totality of display areas and the in-between walls.

The walls may be arranged on the surface 14 in the first area 27 using a known method, which may involve spinning the wall material, e.g. SU-8, onto the surface, pre-baking the layer of wall material, patterning the layer using photo-lithography and removing the wall material from the display area 23.

The next step in the manufacturing process is the increase of the hydrophobicity of the surface 14 within the display area 23. The surface is subjected to a solvent of the material of the hydrophobic layer 15; the solvent may be in the gas or liquid phase. When the hydrophobic layer is made of an amorphous fluoropolymer such as AF1600, AF1601, Cytop or Fluoropel, solvents may be hydrofluoroethers such as HFE7100, or fluorocarbons such as FC40, FC70, PF-5060, AK-225 and FC75, made by the company 3M. These solvents do not dissolve the wall material. The control of the dissolving process may be improved by adding an oil-based diluent to the solvent; the diluent and the solvent form a true solution. Examples of diluents are heptane, tetradecane, decane, octane or pentane. As an example, the HFE7100 molecule has a fluorocarbonyl branch and a carbonyl branch. The fluorocarbonyl branch dissolves the hydrophobic layer, the carbonyl branch aids in forming a good solution with e.g. heptane.

When a liquid solvent is used, the support plate with the hydrophobic layer can be submersed in a bath containing the liquid. Alternatively, the liquid may be sprayed onto the support plate or dispensed on the support plate while spinning the plate. When a gas solvent is used, the support plate with the hydrophobic layer may be positioned in a chamber partly filled with a liquid solvent, avoiding direct contact between the support plate and the liquid. Evaporation of the liquid solvent will cause the support plate to be surrounded by vapor of the solvent, which will result in removing a surface layer of the hydrophobic layer for restoring its hydrophobicity.

After completion of the treatment of the surface, the dissolving process is stopped by immersing the support plate 5 into a bath with a stopping agent, such as an alkene or other liquid, before the solvent or diluent has dried. When the treatment is carried out by a gas solvent, the treatment can be stopped by terminating the contact with the gas. Subsequently, the support plate is immersed into an aqueous solution, such as water, ethanol, IPA (isopropyl alcohol), followed by a drying step. Additionally, the support plate may be subject to an annealing step at 150° C.

The application of the liquids for the treatment of surface 14 may be made by subsequently immersing the support plate 5 in baths containing these liquids. The liquids may be stirred, for example in the solvent bath. Alternatively, the liquids may be applied by successively dispensing and spinning the liquids on the support plate. In either application process, the support plate should not dry between the different baths or spinning cycles.

After completion of the manufacture of the first support plate 5, the first fluid 11 is applied using a known method, as disclosed for example in international patent application WO2005/098797. The first support plate 5 and second support plate 6 are mounted together using e.g. pressure-sensitive adhesive, after the space 10 has been filled with the second liquid 12 in a known manner, as disclosed e.g. in international application WO2009/065909.

Figure 3:
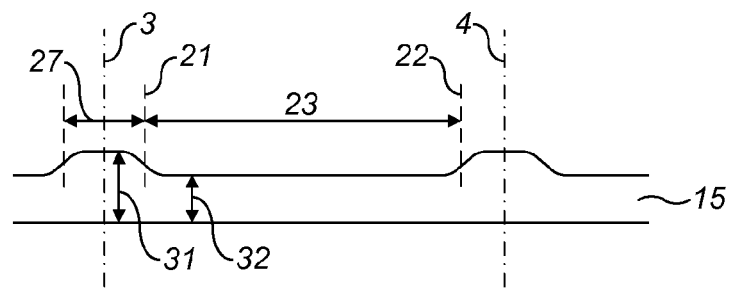
FIG. 3 shows a cross section of the hydrophobic layer of the first support plate.

FIG. 3 shows a cross section of the hydrophobic layer of the display device after the surface treatment according to embodiments. The thickness 31 of the hydrophobic layer 15 in the first area 27 is larger than the thickness 32 of the hydrophobic layer in the display area 23. The difference in thickness can be determined by disassembling the display device, removing any walls using a solvent for the wall material, and measuring the surface profile of the hydrophobic layer over the boundary between the first area 27, where the wall 20 was located, and the display area 23. The surface profile can be measured using a measuring device such as the Filmtek made by the company Scientific Computing International or by a profile scanner. The film thickness can also be determined by making a micrograph of a cross section of the hydrophobic layer.

Although embodiments have been elucidated with reference to an electrowetting display device, further embodiments are envisaged which may apply to any electrowetting device where hydrophilic material has to be arranged on a hydrophobic layer. Examples of other electrowetting devices are electrowetting optical elements such as electrowetting diaphragms and shutters, and lab-on-a-chip devices.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. A method for making a support plate for an electrowetting device, comprising:
    providing the support plate with a hydrophobic layer;
    arranging a pattern of hydrophilic material on the hydrophobic layer; and
    removing a surface layer of the hydrophobic layer by a solvent.

2. A method according to claim 1, wherein the solvent is a solvent for selectively dissolving material of the hydrophobic layer.

3. A method according to claim 1, wherein the solvent is a gas solvent.

4. A method according to claim 1, wherein the removing the surface layer includes the use of a diluent.

5. A method according to claim 4, wherein the diluent is oil-based.

6. A method according to claim 5, wherein the solvent and the diluent form a solution.

7. A method according to claim 6, wherein the solvent is fluorocarbon-based.

8. A method according to claim 1, wherein the solvent is fluorocarbon-based.

9. A method according to claim 8, wherein the solvent and a diluent form a solution, the diluent being used in the removing the surface layer.

10. A method according to claim 1, including stopping the removing the surface layer by applying a liquid, the time between the removing the surface layer and the applying the liquid being sufficiently short for the solvent not to dry before said liquid is applied.

11. A method according to claim 1, including annealing the support plate.

12. A method according to claim 1, including providing a first fluid and a second fluid on the support plate, the first fluid and second fluid being immiscible and the second fluid being one or more of electroconductive and polar;
    providing a further support plate; and
    sealing the support plate and the further support plate, thereby forming a cavity between the support plate and the further support plate that includes the first and second fluids.

13. A method according to claim 1, wherein the electrowetting device is an electrowetting display device.

14. An electrowetting device including a support plate made according to claim 1.

15. A method according to claim 1, including stopping the removing the surface layer by applying a liquid, the time between the removing the surface layer and the applying the liquid being sufficiently short for the diluent not to dry before said liquid is applied.

16. An electrowetting device including a support plate that comprises a hydrophobic layer having a thickness, and a pattern of hydrophilic material arranged on a first area of the hydrophobic layer,
    the thickness of the hydrophobic layer being larger within the first area than outside the first area.

17. An electrowetting device according to claim 16, wherein the hydrophobic layer has a higher hydrophobicity outside the first area than within the first area.

18. An electrowetting device according to claim 16, wherein the electrowetting device is an electrowetting display device.

19. An electrowetting display device according to claim 18, including a plurality of electrowetting elements, wherein the pattern of hydrophilic material comprises walls defining an extent of the plurality of electrowetting elements.

* * * * *